May 26, 1936.  H. C. GRANT, JR  2,042,095

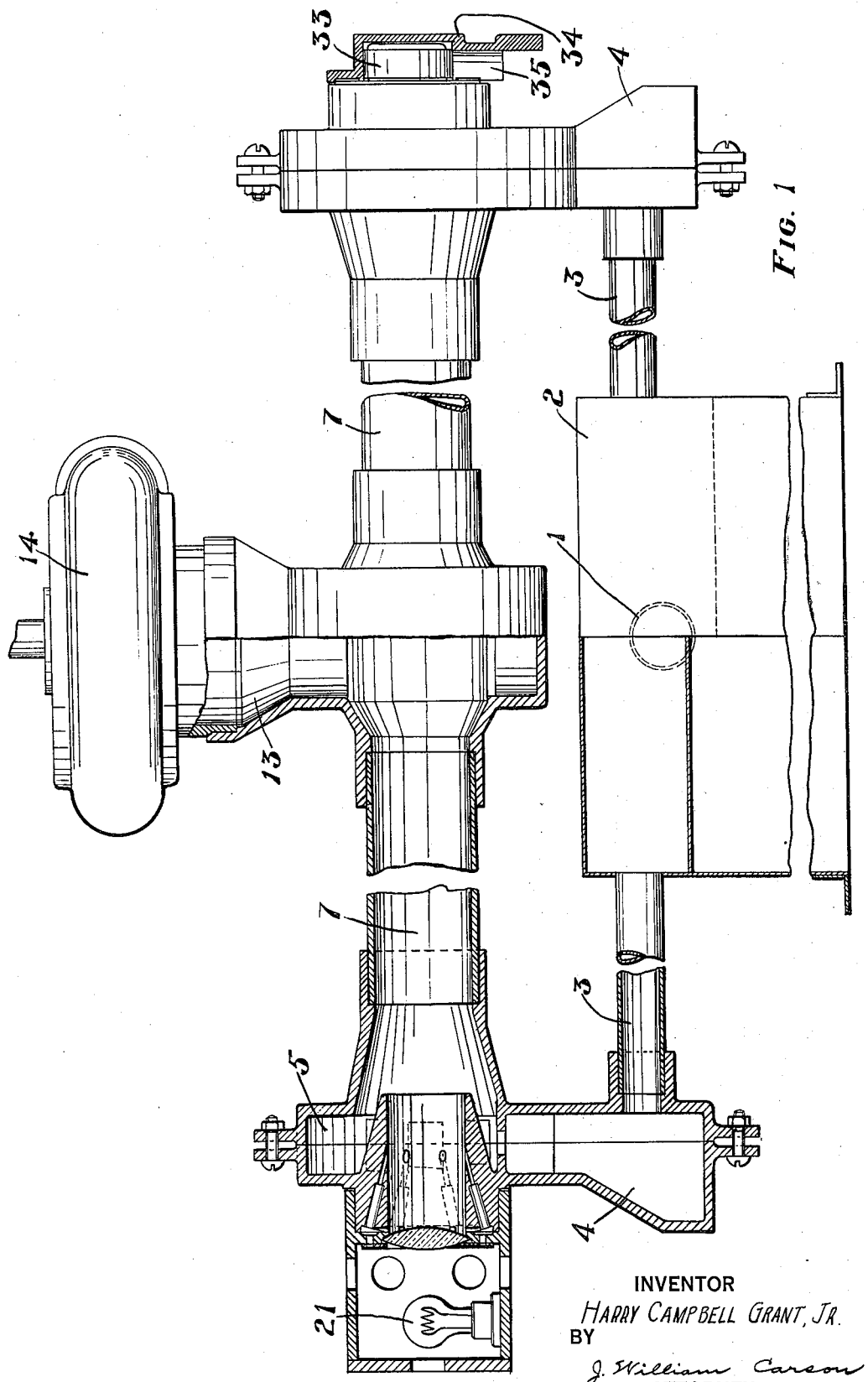

DETECTION OF SUSPENDED MATTER IN GASEOUS FLUIDS

Filed May 8, 1933   2 Sheets-Sheet 2

INVENTOR
HARRY CAMPBELL GRANT, JR.
BY
J. William Carson
ATTORNEY

Patented May 26, 1936

2,042,095

UNITED STATES PATENT OFFICE 2,042,095

DETECTION OF SUSPENDED MATTER IN GASEOUS FLUIDS

Harry Campbell Grant, Jr., New York, N. Y., assignor to Walter Kidde & Company, Inc., New York, N. Y., a corporation of New York Application May 8, 1933, Serial No. 669,992

11 Claims. (Cl. 88—14)

The present invention relates broadly to detecting apparatus for detecting the presence of suspended matter in gaseous fluids, and embodies more specifically, improved means for detecting the presence of smoke in a fluid stream, whether the latter be led from an area or space which is to be supervised against the outbreak of a fire, or whether it be led from an area or space in which combustion normally takes place but in which it is desired to control or limit the density or quantity of smoke produced.

In apparatus of the type to which the present invention belongs, which apparatus normally includes an elongated chamber, a light-sensitive element situated at one extremity of the chamber, a source of light situated at the opposite end of the chamber and arranged to direct a beam of light through the chamber upon the light-sensitive element, and connections for passing a fluid stream through the chamber between the source of light and the light-sensitive element, whereby the presence of suspended matter in the fluid stream will decrease the intensity of the light falling upon the light-sensitive element, so that the latter can be employed to exercise some controlling or indicating effect, a serious difficulty has been encountered due to the continued collection of normally inconsiderable quantities of dirt and soot upon the various optical elements, such continued collection of opaque matter tending to decrease the intensity of the light falling upon the light-sensitive element, making it necessary to clean the optical elements frequently in order to avoid false conditions of control or indication.

In connection with the above, it should be understood that when apparatus of the type referred to is employed for supervising a space or area against the outbreak of fire, the electrical circuits controlled by the light-sensitive element are so arranged as not to respond to the presence of normally expected quantities of dirt or dust encountered in the space being supervised; and it is the continued collection of this normally inconsiderable quantity of dirt or dust which causes the difficulty above referred to. Likewise, when the apparatus is employed to control or indicate the density or quantity of smoke produced in a given space, the same difficulty is encountered, as the apparatus must be arranged so as not to detect the presence of normally expected but inconsiderable quantities of dirt and soot.

It has, of course, been proposed to overcome the abovementioned difficulty by providing openings in the wall of the detecting chamber adjacent the optical elements for the purpose of permitting a flow of clean air from the exterior atmosphere past the optical elements so as to prevent the deposition of opaque matter on said elements, but this measure by itself has not constituted a satisfactory solution of the problem.

It is accordingly the primary object of the present invention to provide an apparatus of the general type referred to, but which is so designed as to prevent or minimize the deposition of opaque matter on the optical elements of the apparatus.

The principal feature of the present invention by which the above-mentioned object is accomplished, is the provision of a novel arrangement of the fluid stream conducting path, whereby the fluid stream is introduced into the detecting chamber of the apparatus adjacent each end thereof and is discharged from the detecting chamber at a point intermediate the points of inlet, so as to produce in the first instance a continuous flow of fluid towards the center of the detecting chamber and away from both the source of light and the light-sensitive element.

Another feature which assists in accomplishing the desired object is the provision of flow-directing means interposed in the paths of the fluid streams from the inlets to the outlet, so arranged as to deflect the flow of fluid away from the optical elements and toward the outlet.

A still further feature is the provision of special inlet and outlet connections for introducing the fluid into the detecting chamber and discharging it therefrom at various points around the periphery of the detecting chamber, so as to minimize the creation of eddy currents, such as would tend to disturb the desired continuous flow of fluid away from the optical elements.

Still another feature of the invention is the spacing of the optical elements at an appreciable distance from the paths of flow of fluid from the inlets to the outlet, said spacing being effected by arranging the optical elements at the ends of passages constituting continuations of the detecting chamber past the previously mentioned flow directing and deflecting means.

Another feature is the provision of means for creating a flow of clean atmospheric air toward the outlet of the apparatus through the passages separating the optical elements from the paths of fluid flow from the inlets to the outlet, for the purpose of preventing the formation of eddy currents in said passages.

Another feature is the provision of passages for permitting the flow of atmospheric air directly past the surfaces of the optical elements in communication with the detecting chamber.

Still another feature of the present invention is the provision of means for removing dirt and soot from the fluid stream before its introduction into the detecting chamber.

These, and further objects and features of the invention not specifically enumerated above, will be apparent as the invention is described in greater detail in connection with the accompanying drawings, wherein:

Figure 1 is a complete view of the essential elements of the present invention, portions of the view being shown in central longitudinal section.

Figures 2, 3:
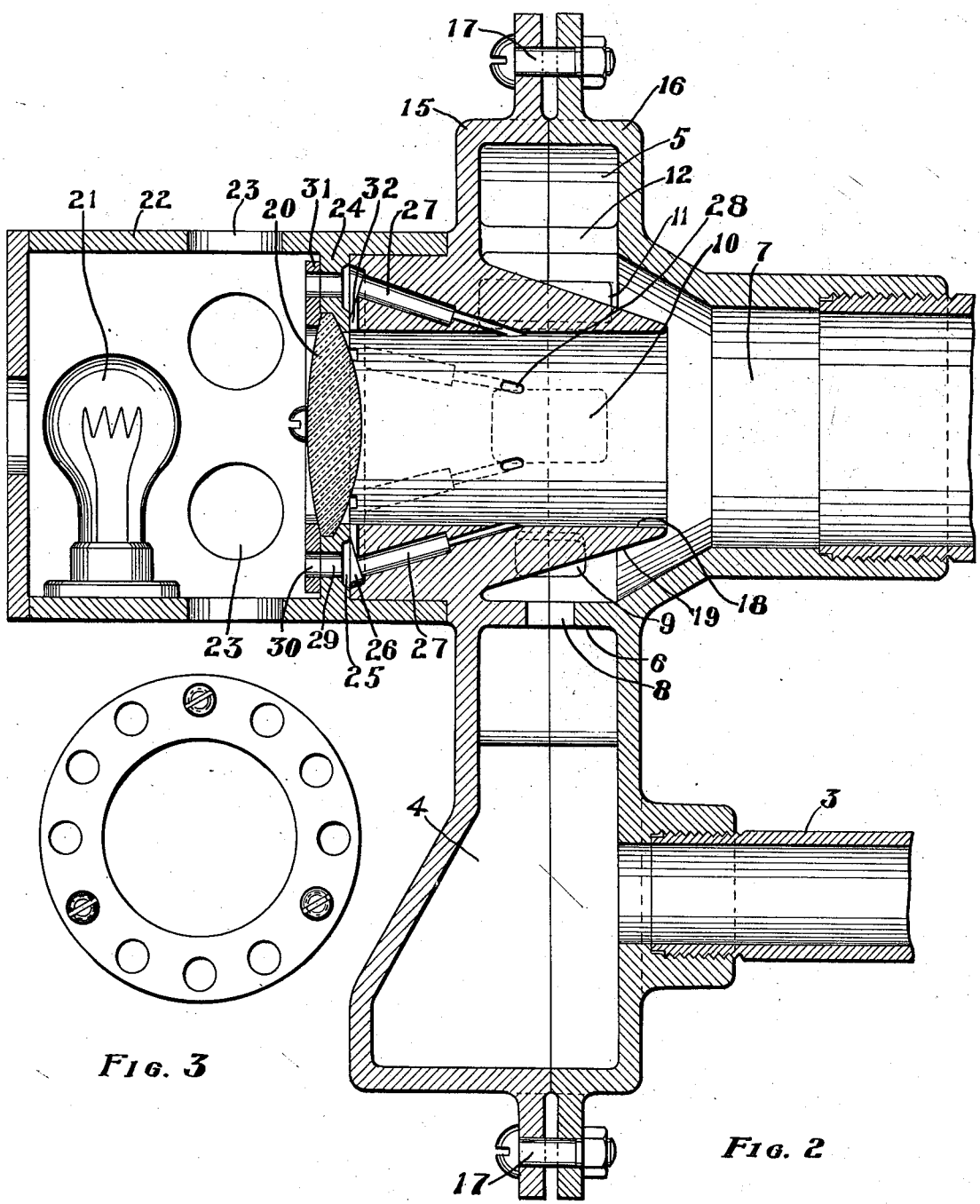
Figure 2 is an enlarged view in section of the left-hand portion of Figure 1.
Figure 3 is a view of the lens retainer ring shown in Figure 2.

Referring to the drawings, the reference numeral 1 represents a fluid stream intake connected by suitable conducting means to an area or space within which smoke, dust, or other suspended matter may develop, the density or quantity of which suspended matter is to be controlled or indicated. The reference numeral 2 represents a dirt trap designed with suitable baffle surfaces around which the fluid stream entering the intake 1 must pass, and on which undesired normal quantities of dirt in the fluid stream may be deposited. However, the specific construction of the dirt trap forms no part of the present invention. Branching out from the dirt trap 2 are the fluid conductors 3, which conduct the fluid stream in separated portions into the distributing chambers 4. Each said distributing chamber 4 is in communication with a distributing manifold 5, the distributing manifolds 5 being in the form of annular passages encircling the walls 6 at the ends of the detecting chamber 7. Referring now to the constructional details of the left-hand end of the apparatus, as shown on an enlarged scale in Figure 2, the wall 6 is shown provided with circumferential openings 8, 9, 10, 11 and 12, which permit the passage of fluid from the distributing manifold 5 to the interior of the detecting chamber 7. In order to control the flow of fluid into the detecting chamber, it being desirable to supply approximately equal quantities of fluid at various portions of the circumference of the wall 6, the openings 8, 9, 10, 11 and 12 increase in size with their degree of remoteness from the distributing chamber 4, this arrangement providing the desired balanced flow of fluid into the detecting chamber.

Referring to Figure 1, it will be seen that the divided portions of the fluid stream which are introduced into the ends of the detecting chamber both flow toward the central portion of the apparatus, where they meet and are discharged through the discharge outlet 13, which communicates with the detecting chamber at various portions of its circumference in the same manner that the distributing chambers 4 communicate with the ends of the detecting chamber through the annular distributing manifolds 5. In Figure 1 the reference numeral 14 represents an air exhauster adapted to be operated by any suitable source of motive power, the exhauster serving to maintain a continuous flow of fluid from the fluid intake 1 of the apparatus to the discharge outlet 13, said continuous flow being maintained without the development of undesirable eddy currents by reason of the particular construction of the inlets and outlet of the detecting chamber, which effect a smooth balanced distribution and flow of the fluid stream.

Referring again to Figure 2, it will be noted that the distributing chamber and distributing manifold are constructed in two halves 15 and 16, for facilitating the construction of the apparatus, said halves being secured to each other by bolts 17 passing through flanges on the halves 15 and 16. It will also be noted that the member 15 is provided with a passage 18, which in effect is a continuation of the detecting chamber 7, and that the outer surface 19 of the wall defining the passage 18 is sloped at such an angle and is so arranged in the path of flow of the fluid from the distributing manifold 5 to the detecting chamber 7 that it exerts a positive directing effect on the flow of fluid toward the central portion of the detecting chamber, at the same time deflecting the flow of fluid away from the outer end of the passage 18.

At the outer end of the passage 18 shown in Figure 2, is secured the light-directing lens 20, said lens serving to direct light from the source of illumination 21 in a practically parallel beam from one end of the detecting chamber to the other. The source of illumination 21 is mounted in a suitable chamber 22, which communicates with the atmosphere through various openings 23, which serve the purpose of permitting the heat developed by the source of illumination to be dissipated. The openings 23 also serve to supply clean air which is drawn into the passage 18 in the manner and for the purpose now to be described. In the above connection, it will be noted that the lens 20 is mounted on a wall 24 of the chamber 22 and that this wall is provided with an annular passage 25 which is in direct communication with an annular passage 26 of the member 15. At various points around the annular passage 26 of the member 15 are provided passages 27 which communicate with the passage 18 through openings 28 in the wall thereof. On the other hand, at various points around the annular passage 25 in the wall 24 of the chamber 22, are provided passages 29 which are aligned with passages 30 in the lens retainer ring 31, the latter of which is shown in detail in Figure 3.

With the construction as just described, air is drawn into the passage 18 through the openings 23, the passages 30, the passages 29 and the passages 27, thus establishing a positive flow of air away from the lens 20 toward the central portion of the detecting chamber, the purpose of this construction being to prevent the formation of eddy currents in the passage 18, such as would be formed by the flow of fluid past the inner end of the passage 18, if no means were provided for preventing such eddy currents.

Still referring to Figure 2, it will be noted that passages 32 are provided, leading from the annular passage 26 into the passage 18 directly adjacent the lens 20, these passages serving to supply clean air directly in front of the lens and to further minimize the formation of eddy currents.

The above substantially completes the description of the left-hand end of the apparatus; and in connection with the right-hand end of the apparatus, it should be noted that the same details of construction are employed, except that, as shown in Figure 1, a light-sensitive element 33 of the photo-voltaic type is employed, instead of the source of illumination 21, said light-sensitive element being enclosed in a suitable chambered member 34 provided with an opening 35 for the electrical connections to the light-sensitive element. Of course, no lens need be employed in front of the light-sensitive element.

which latter itself serves to directly close the right-hand end of the detecting chamber 7.

In view of the foregoing description of a specific embodiment of the present invention, it will be seen without further detailed explanation, that I have accomplished the objects set out at the beginning. It should be noted, however, that the various features of the invention by which said objects have been accomplished may be incorporated in other forms of construction than that illustrated in the drawings, within the spirit and scope of the invention; and I therefore do not wish to be limited save as defined in the appended claims.

I claim:

1. In apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points substantially adjacent both the light-sensitive element and the source of light on the sides of the light-sensitive element and the source of light nearest to each other along the path defined by the beam of light, and means for discharging the divided portions of the fluid stream situated intermediate the points of introduction thereof, each of the means for introducing the fluid into and discharging the fluid from the detecting chamber comprising a continuous passage encompassing a peripheral wall of the detecting chamber, fluid conducting means communicating with said passage, and openings spaced around the periphery of said peripheral wall for establishing communication between said passage and the detecting chamber, whereby a substantially balanced flow of fluid through the detecting chamber takes place in a direction away from both the light-sensitive element and the source of light.

2. In apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points substantially adjacent both the light-sensitive element and the source of light on the sides of the light-sensitive element and the source of light nearest to each other along the path defined by the beam of light, and means for discharging the divided portions of the fluid stream situated intermediate the points of introduction thereof, each of the means for introducing the fluid into and discharging the fluid from the detecting chamber comprising a continuous passage encompassing a peripheral wall of the detecting chamber, fluid conducting means communicating with said passage, and openings spaced around the periphery of said peripheral wall for establishing communication between said passage and the detecting chamber, said openings being smallest in size adjacent said fluid conducting means and increasing in size in proportion to their degree of remoteness from the fluid conducting means, whereby a substantially balanced flow of fluid through the detecting chamber takes place in a direction away from both the light-sensitive element and the source of light.

3. In an apparatus embodying a fluid conducting chamber having fluid conducting inlet and outlet means, the provision of means for maintaining a substantially balanced flow of fluid through the chamber from an inlet means to an outlet means, said last named means comprising a continuous fluid conducting passage encompassing a peripheral wall of the fluid conducting chamber and interposed in a fluid conducting means, and openings spaced around the periphery of said peripheral wall for establishing communication between said passage and said chamber, said openings being smallest in size adjacent said fluid conducting means and increasing in size in proportion to their degree of remoteness from the fluid conducting means.

4. In apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points substantially adjacent both the light-sensitive element and the source of light on the sides of the light-sensitive element and the source of light nearest to each other along the path defined by the beam of light, means for discharging the divided portions of the fluid stream situated intermediate the points of introduction thereof, each of the means for introducing the fluid into and discharging the fluid from the detecting chamber comprising a continuous passage encompassing a peripheral wall of the detecting chamber, fluid conducting means communicating with said passage, and openings spaced around the periphery of said peripheral wall for establishing communication between said passage and the detecting chamber, and deflecting means interposed in the paths of the divided portions of the fluid stream immediately adjacent their points of introduction into the detecting chamber for directing the flow of the fluid toward the discharge means and away from both the light-sensitive element and the source of light.

5. In apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points substantially adjacent both the light-sensitive element and the source of light on the sides of the light-sensitive element and the source of light nearest to each other along the path defined by the beam of light, means for discharging the divided portions of the fluid stream situated intermediate the points of introduction thereof, each of the means for introducing the fluid into and discharging the fluid from the detecting chamber comprising a continuous passage encompassing a peripheral wall of the detecting chamber, fluid conducting means communicating with said passage, and openings spaced around the periphery of said peripheral wall for establishing communication between said passage and the detecting chamber, and deflecting means interposed in the paths of the divided portions of the fluid stream immediately adjacent their points of introduction into the detecting chamber for directing the flow of the fluid toward the discharge means and away from both the light-sensitive element and the source of light, each said deflecting means comprising a continuous surface adjacent to and spaced from said openings and tapering inwardly toward the discharge means of the detecting chamber.

6. In apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points substantially adjacent both the light-sensitive element and the source of light on the sides of the light-sensitive element and the source of light nearest to each other along the path defined by the beam of light, means for discharging the divided portions of the fluid stream situated intermediate the points of introduction thereof, light-transmitting passages normally communicating with the detecting chamber and spacing, respectively, the light-sensitive element and the source of light from the path of flow of the fluid through the detecting chamber, each of the means for introducing the fluid into and discharging the fluid from the detecting chamber comprising a continuous passage encompassing a peripheral wall of the detecting chamber, fluid conducting means communicating with said passage, and openings spaced around the periphery of the peripheral wall for establishing communication between said passage and the detecting chamber, and deflecting means interposed in the paths of the divided portions of the fluid stream immediately adjacent the points of introduction into the detecting chamber for directing the flow of the fluid toward the discharge means and away from both the light-sensitive element and the source of light, each said deflecting means comprising a continuous surface adjacent to and spaced from said openings and tapering inwardly toward the discharge means of the detecting chamber and terminating at its plane of intersection with a defining wall of an aforesaid light-transmitting passage.

7. In an apparatus embodying a fluid conducting chamber having fluid conducting inlet and outlet means, the provision of means for maintaining a substantially balanced flow of fluid through the chamber comprising a continuous fluid conducting passage encompassing a peripheral wall of the fluid conducting chamber and interposed in a fluid conducting means, openings spaced around the periphery of said peripheral wall for establishing communication between said passage and said chamber, said openings being smallest in size adjacent said fluid conducting means and increasing in size in proportion to their degree of remoteness from the fluid conducting means, and deflecting means interposed in the path of the fluid introduced into the fluid conducting chamber by an inlet means for directing the flow of the fluid toward an outlet means, said deflecting means comprising a continuous surface adjacent to and spaced from said openings and tapering inwardly in a direction toward an outlet means.

8. In an apparatus embodying a fluid conducting chamber having fluid conducting inlet and outlet means, the provision of means for maintaining a substantially balanced flow of fluid through the chamber comprising a substantially continuous fluid conducting passage encompassing a peripheral wall of the fluid conducting chamber and interposed in a fluid conducting means, openings spaced around the periphery of said peripheral wall for establishing communication between said passage and said chamber, and deflecting means interposed in the path of the fluid introduced into the fluid conducting chamber by an inlet means for directing the flow of the fluid toward an outlet means, said deflecting means comprising a continuous surface adjacent to and spaced from said openings and tapering inwardly in a direction toward an outlet means.

9. In an apparatus for detecting the presence of suspended matter in gaseous fluids comprising a detecting chamber, a light-sensitive element arranged at one point of the chamber, a source of light situated at another point of the chamber and adapted to direct a beam of light through the chamber upon the light-sensitive element, connections for passing a fluid stream through the chamber between the source of light and the light-sensitive element, and means to maintain a flow of fluid through the detecting chamber, the provision of means for introducing the fluid stream into the detecting chamber in divided portions at points intermediate the light-sensitive element and the source of light, means for discharging the divided portions of the fluid stream situated intermediate the points of introduction thereof, each of the means for introducing the fluid into and discharging the fluid from the detecting chamber comprising a continuous passage encompassing a peripheral wall of the detecting chamber, fluid conducting means communicating with said passage, and openings spaced around the periphery of said peripheral wall for establishing communication between said passage and the detecting chamber, whereby to obtain a substantially balanced flow of fluid through the detecting chamber in a direction away from both the light-sensitive element and the source of light, and means to minimize the formation of eddy currents in the portions of the detecting chamber adjacent the light-sensitive element and the source of light comprising means to create a substantially balanced flow of clean air in said portions of the detecting chamber in a direction away from both the light-sensitive element and the source of light, said last named means comprising a plurality of peripherally spaced passages communicating with the atmosphere and opening into said portions of the detecting chamber.

10. An apparatus for detecting the presence of suspended matter in gaseous fluids according to claim 9, in which said plurality of peripherally spaced passages are arranged to direct a flow of clean air directly past the surfaces of the optical elements in communication with the end portions of the detecting chamber.

11. An apparatus for detecting the presence of suspended matter in gaseous fluids according to claim 9, in which said plurality of peripherally spaced passages are arranged to direct a flow of clean air into the end portions of the detecting chamber in a direction toward the fluid discharging means and at a substantial distance from the surfaces of the optical elements in communication with the end portions of the detecting chamber.

HARRY CAMPBELL GRANT, Jr.